Figure 1:
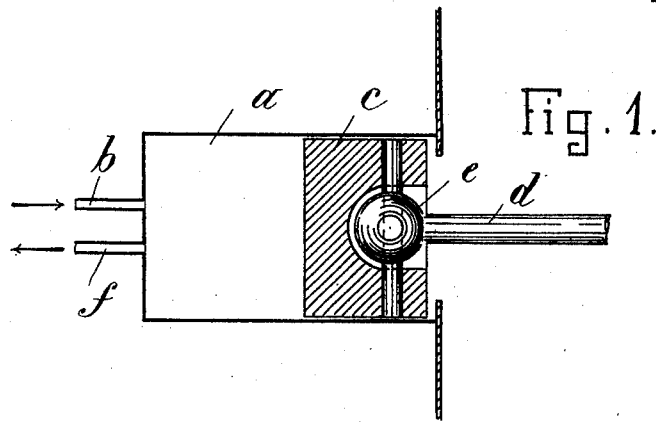

No. 758,059. PATENTED APR. 26, 1904.
K. GEUCKE.
AUTOMATIC BRAKE COUPLING FOR RAILWAY OR ELECTRIC CARS.
APPLICATION FILED MAR. 4, 1903.
NO MODEL. 4 SHEETS—SHEET 1.

Witnesses:
Arthur Zunge
William Schulz

Inventor:
Kurt Geucke
by his attorney
Frank V. Briesen

No. 758,059. PATENTED APR. 26, 1904.
K. GEUCKE.
AUTOMATIC BRAKE COUPLING FOR RAILWAY OR ELECTRIC CARS.
APPLICATION FILED MAR. 4, 1903.
NO MODEL. 4 SHEETS—SHEET 2.

No. 758,059. PATENTED APR. 26, 1904.
K. GEUCKE.
AUTOMATIC BRAKE COUPLING FOR RAILWAY OR ELECTRIC CARS.
APPLICATION FILED MAR. 4, 1903.
NO MODEL. 4 SHEETS—SHEET 3.
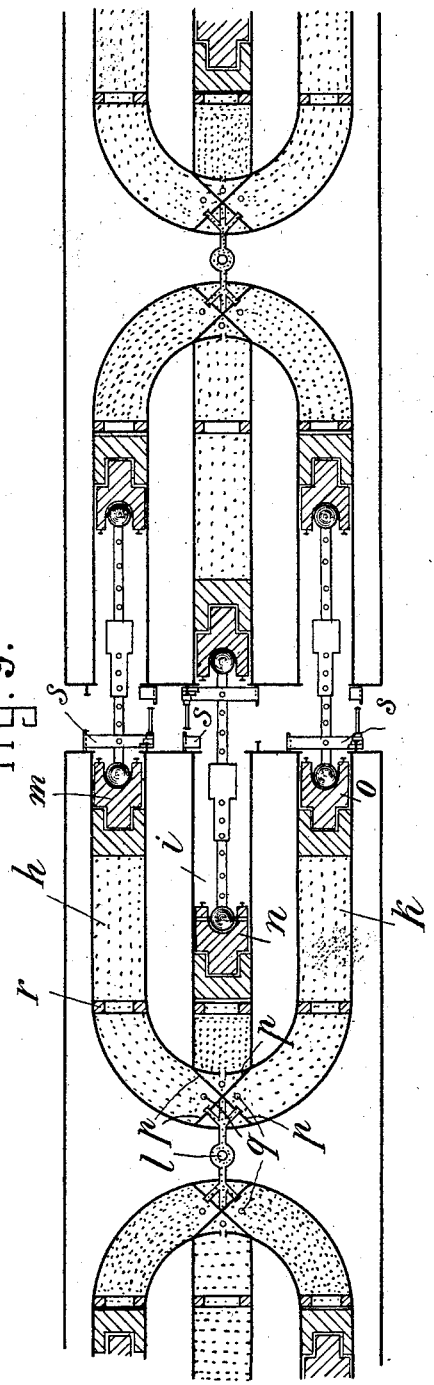
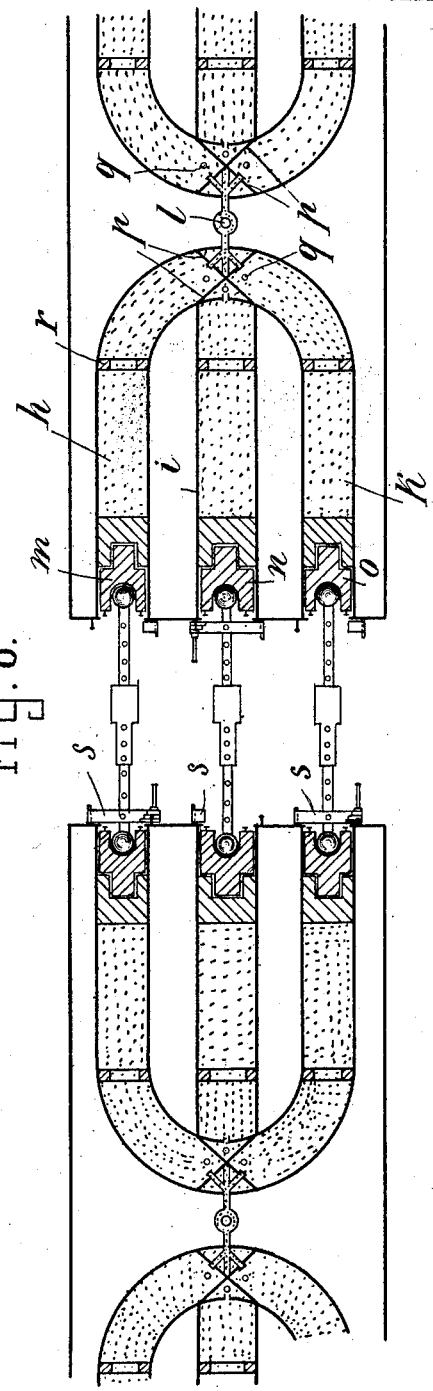

No. 758,059. PATENTED APR. 26, 1904.
K. GEUCKE.
AUTOMATIC BRAKE COUPLING FOR RAILWAY OR ELECTRIC CARS.
APPLICATION FILED MAR. 4, 1903.
NO MODEL. 4 SHEETS—SHEET 4.
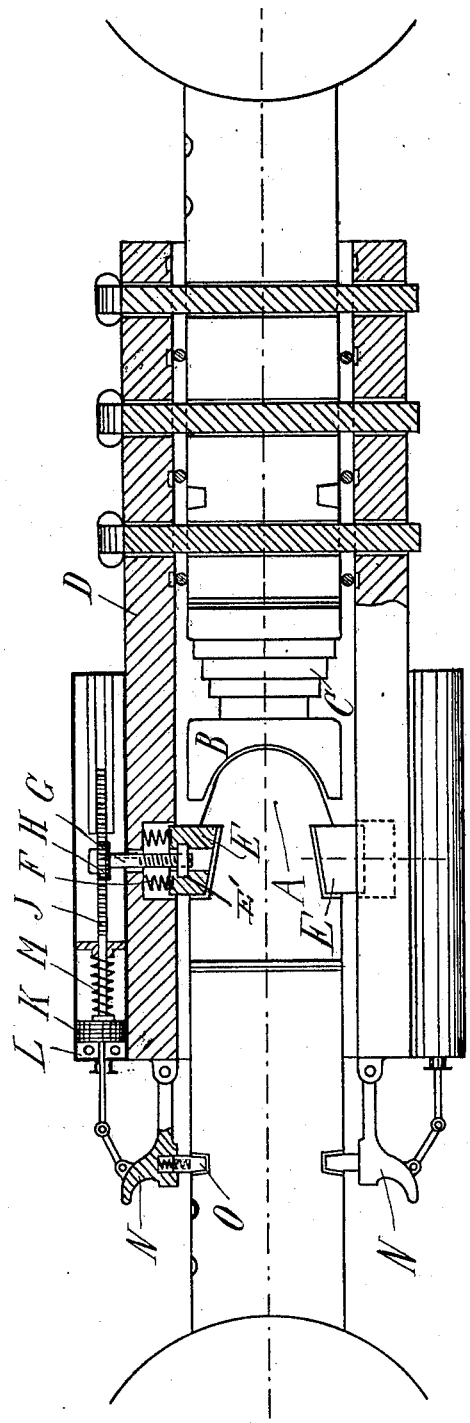

No. 758,059. Patented April 26, 1904.

UNITED STATES PATENT OFFICE.

KURT GEUCKE, OF TEGELORT, NEAR BERLIN, GERMANY.

AUTOMATIC BRAKE-COUPLING FOR RAILWAY OR ELECTRIC CARS.

SPECIFICATION forming part of Letters Patent No. 758,059, dated April 26, 1904.

Application filed March 4, 1903. Serial No. 146,048. (No model.)

*To all whom it may concern:*

Be it known that I, KURT GEUCKE, a subject of the King of Saxony, residing at Tegelort, near Berlin, in the Kingdom of Prussia, Germany, have invented certain new and useful Improvements in and Connected with Automatic Brake-Couplings for Railway or Electric Cars, of which the following is a specification.

The present invention relates to an automatical coupling serving at the same time as buffer and brake device, the fastening members of which being movably arranged in cylinders form at the same time the brake-setting pistons, serve as reversed buffers, and are acted upon by compressed air, steam, gas, or the like in such a manner that by the compression of the driving medium taking place at a collision of the vehicles the living force of the vehicle is partly destroyed and the brakes become set in the braking position. The automatical brake-coupling thus comprises in a single device the coupling, buffers, and brake, and may also serve in winter for the heating of the cars. In its nature as a brake the same comprises a device for setting the brakes by hand as well as an automatically-acting brake.

The objects of the present invention are thus the following: first, the automatical locking of the coupling; second, the automatical release of the coupling, and, third, the suppression of the effects of the collision and the braking action, which without danger for the cars and passengers causes the train immediately to stop. This latter action takes place automatically at any perturbation of the train in its inertia of power and always with the same force as caused by the resistance. The collision itself creates the force which again suppresses its action—so, for instance, with collisions, derailment, the braking of the wheel or axle, and generally with any accidents which may occur for any reason and are attended with the suppression of the inertia of power. The device does not only give way with a great yielding resistance at the collision, but acts also at the same time against this collision and suppresses it by a counter thrust and the braking action in its own car as well as in the car running against it.

In order to make my invention more clear, the same is illustrated in the accompanying drawings, in which similar characters denote similar parts.

Figure 1 is a vertical section of the brake-coupling in its plainest form. Figs. 2 to 9 are horizontal sections of different modifications of this brake-coupling applied to a pair of cars to be coupled. Fig. 10 is a horizontal section through the coupling-lock and the device for the automatic release of this lock.

Figure 2:
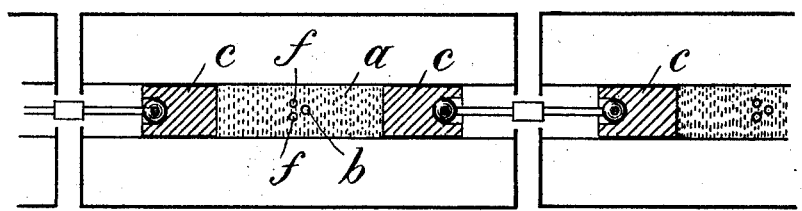
Figure 3:
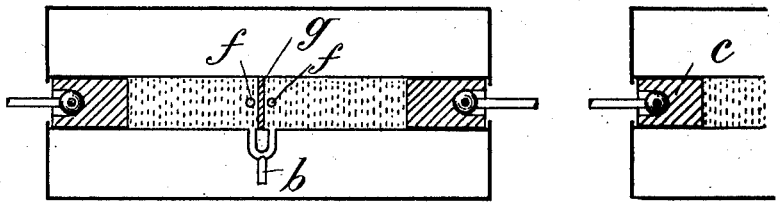

Referring to Fig. 1, there is in the bottom of the car arranged a tube or cylinder $a$, having pipe connections $b$ at its rear end with the reservoir for compressed air, steam, or the like on the engine, so that compressed air, steam, gas, or the like can be supplied to the said cylinder. The inner end of the latter is tightly closed, whereas its front end is open. In said cylinder a piston $c$ is adapted to move forward and backward, said piston serving as buffer and carrying the draw-bar $d$ by means of a ball or universal joint $e$. The open end of cylinder $a$ is provided with an inwardly-extending flange, which prevents the withdrawal of the piston from the cylinder. It will be seen that this piston replaces the hitherto-known rigid attachment of the elastic buffer to the frame of the car. The draw-bar is provided at its outer end in the usual manner with the coupling-head (not shown in this figure) which is to be coupled with the coupling-head of the adjacent car in any suitable manner. The piston $c$ may be made of metal and provided with suitable packing-rings or the like for tightening up the piston in the cylinder. The latter may have an inner diameter of about twelve to eighteen inches. There is a second pipe connection $f$ at the rear end of the cylinder leading into the brake device of the car. Normally the piston is at the outer end of the cylinder and the latter is filled with compressed air, steam, or the like. If the train meets with a resistance during its run the cars approach each other, and the pistons acting as buffers move inwardly in the cylinders and cause a compression of the driving medium. Owing to this compression of the driving medium the valves which may be arranged on the rear end of the cylinders to close up the pipe connections of the brake devices are opened, and the compressed air, steam, or gas is transmitted directly to the brake device, whereby the brakes are immediately set into the working position and cause the train to stop. This is the principle upon which the present invention is based. To apply this principle to the practice, the cylinder $a$ may be made to extend through the entire length of the bottom part of the car, as shown in Fig. 2, and two pistons may be arranged to work in the same, one for the front and the other for the rear wheels. The pipe connections $b$ and $f$ may terminate in the center of this cylinder. It will be seen that separate pipe connections of the brake devices are arranged for the front and rear wheels on one side of the car and for those on the other side of the latter, respectively. As seen from Fig. 3, this cylinder $a$ may be provided in the middle with a partition-wall $g$, one pipe connection $f$ terminating on one side and the other on the other side of this wall in the two different compartments of the cylinder $a$, the pipe connection $b$, leading from the reservoir of the engine, being branched to supply the two compartments with compressed air, steam, or the like, one of the compartments and the piston serving for the front and the other for the rear wheels of the car.

Figure 4:
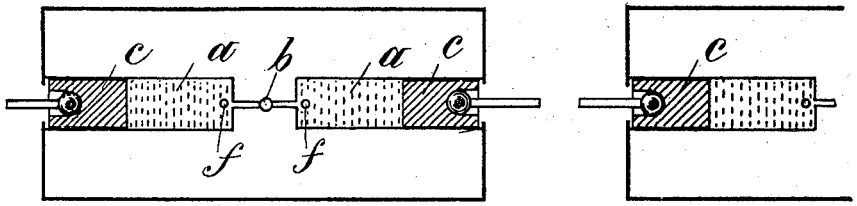

Instead of having a partition-wall arranged in the cylinder two separate cylinders may be provided, as shown in Fig. 4. These two cylinders, each at one end of the car, may be supplied with the driving medium from the pipe connection arranged between the two cylinders and branching off in the two cylinders, as shown in this figure.

Figure 5:
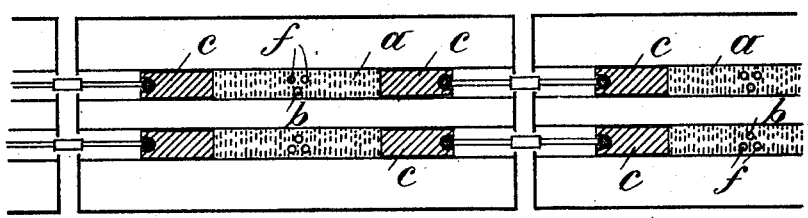
Figure 6:
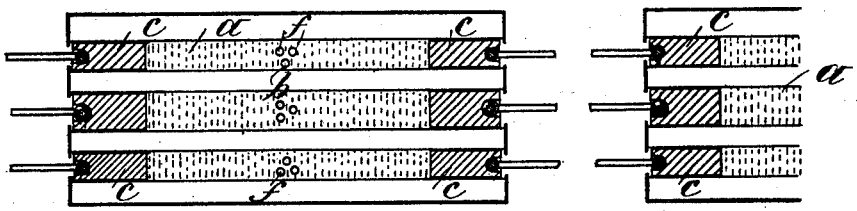

Instead of a single cylinder, as shown in the foregoing figures, there may be two or three cylinders arranged, the same extending parallel to each other throughout the entire length of the bottom of the car, as shown in Fig. 5 and Fig. 6. Each cylinder is provided with two pistons which are adapted to work according to those of the foregoing figures. The pipes leading into the brake devices and the feed-pipe of the engine terminate in the middle of each of these cylinders. By having the number of the cylinders and the pistons respectively increased the force required for the braking and buffing action accordingly can be essentially increased.

Figure 7:
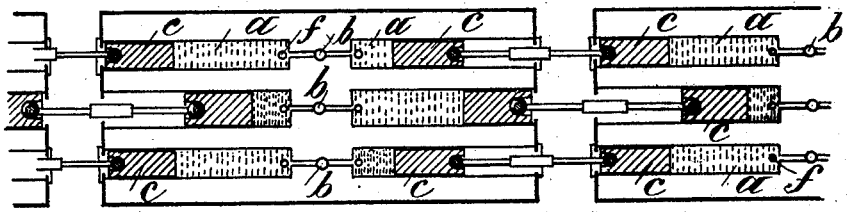

Instead of the arrangement of Fig. 6 there may be separate cylinders arranged on each end of the car, Fig. 7, similar to the arrangement of Fig. 4, each cylinder being provided with a separate piston and having a pipe connection with the respective brake device and one pipe connection being arranged for each pair of cylinders leading from the engine. I, however, prefer the modification embodied in Figs. 8 and 9, which I find to be the most advantageous and important of all foregoing modifications shown. In the bottom or the double bottom of each car on the front as well as on the rear end of the latter there is a bifurcated pipe, each comprising three cylindrical branches $h\ i\ k$ and having a closed curved inner end. The curved ends of both these pipes meet about in the middle of the bottom of the car. The two bifurcated pipes of each car are supplied with steam, compressed air, or the like through a valve $l$, arranged between the same in the pipe connection leading from the engine and terminating with branch connections in each of the bifurcated pipes. The outer open ends of each of the cylindrical branches $h\ i\ k$ of the bifurcated pipes are tightly closed by the pistons $m\ n\ o$ working therein and arranged similarly to those of the foregoing modifications. Each cylinder of the bifurcated pipes is separated from the other cylinders by partition-walls $p$, into which the branches of the pipe connection of the engine terminate, and is provided with a separate opening $q$ and valve for the pipe connection leading into the corresponding brake device. Each piston works thus in a separate compartment tightly separated from the others. The cylinders $h\ h$ on one side of the car and their pistons thus serve to act upon the front and rear wheels, respectively, of the car, and the cylinders $k\ k$ serve for the front and rear wheels on the opposite side of the car, while the middle cylinders $i\ i$ of the bifurcated pipes on each car serve to act on the wheels of both sides of the car simultaneously. Each car has thus two large chambers, comprising together six compression-rooms, of which advantageously three only come simultaneously in action, either the two lateral cylinders $h\ h$ for the front wheels and the middle cylinder $i$ for the rear wheels, or vice versa. The brakes of each car are thus controlled from three points. The braking action takes place simultaneously and with uniform force on each wheel of the car, which is equal to the force of the collision, inasmuch as the latter has not yet been suppressed by the elasticity and the resistance of the driving medium in the cylinders of all cars. In order to have only three pistons in operation, as heretofore stated, the three others are cut out by means of suitable locking devices. The object of having the middle piston or the two lateral pistons in each bifurcated pipe cut out is to prevent each coupled draw-bar of two adjacent cars from being forced with both pistons at its ends simultaneously into the front cylinder of one car and the rear cylinder of the other car, which would allow only half of the effect. By having from the first the middle or the lateral pistons of one car and the lateral or the middle pistons of the other car, respectively, cut out the draw-bars are forced at a collision or the like only into one cylinder, so that the piston can work at the entire length of its stroke in the cylinder of the front or rear car. The operation of the modification shown in Figs. 8 and 9 is quite similar to that of the foregoing modifications specified. The braking action grows progressively with the disturbance of the inertia—that is to say, with the diminution of the space between the cars allowed by the present device. The braking action thus increases according as the pistons enter the respective cylinders, and consequently proportionally with the increase of the compression and the displacement of the driving medium in the cylinders.

The following example will show the yieldingness of this coupling allowed by the diminution of the spaces between the cars at a collision and how the elastic resistance thereby simultaneously grows. Supposed two trains each having twelve cars approach each other on the same railroad, the distance between the cars being about seventy inches and the cars being allowed to approach for about twenty-four inches. Hence the visible yieldingness between each two cars amounts about to forty-eight inches. Between the engine and the twelve cars there are altogether twelve spaces, so that the total visible yieldingness of each train amounts to forty-eight feet and of both trains to ninety-six feet. These figures relate, however, only to the exteriorly-visible displacement. In fact, the elastic resistance to overcome is double the amount, for not only the lateral pistons $m$ and $o$ move inward forty-eight inches, but the middle pistons $n$, as well, move the same distance in the reversed direction. Hence the yieldingness and the resistance, respectively, of both trains amounts to one hundred and ninety-two feet. This amount can be further increased by the following arrangement: When the pistons have reached the very end of their stroke, the length of which may be fixed by the arrangement of elastic rings or stops $r$ within the cylinders, and when the cars have approached each other for a certain distance, locking devices $s$ of any suitable construction may be automatically brought in position to release the other three pistons, which up to now have been cut out, so that the same will now also enter their own cylinders and allow a further approachment of the cars up to about eight inches, provided each lock $s$ is four inches thick. Taking thus for the greatest approachment allowed between each two cars, the distance from seventy-two inches to eight inches, the total yieldingness and resistance, respectively, of both trains amounts to two hundred and seventy-two feet. This distance the counter-force must overcome, which will find immediately the same resistance in its own system before even the slightest contact of the exterior front parts of the walls of the cars can take place. Reckoned with the same proportions, the volume of the displacement of the driving medium would amount to 31,228.3 cubic feet, and in case the middle cylinder is made of double the volume of the lateral cylinders in order to obtain a uniform braking action the displacement will amount to 39,785.9 cubic feet.

The device specified in its different modifications can be applied in a most simple way to any car. All cars are uniformly built and provided with the automatic brake-coupling on the front and rear end.

The coupling-heads are of less diameter than the inner diameter of the flanged cylinder-opening, so that the heads may enter the cylinder in case of collision. The coupling-heads may be constructed as shown in Fig. 10, in which the convex coupling-head A of one car takes into the concave coupling-head B of the adjacent car, or both coupling-heads may be of uniform shape, both convex, and adapted to rest against each other when the cars are coupled. The coupling-heads may be provided with springs C, so as to offer a certain elasticity. Any coupling-lock may be used for the purpose to automatically lock the coupling-heads. The lock shown in Fig. 10 consists of a hub D, applied to one of the draw-bars to be coupled and attached to it in any suitable manner. In this hub locking-bolts E are arranged, which are normally pressed inward by springs F. Within the bolts are nuts E', into which screw-bolts G can be screwed in and outward. These screw-bolts carry on their outer ends small tooth-wheels H, keyed to them, said wheels being adapted to gear with racks J, connected with pistons K, working in cylinders L, laterally applied to the hub D. When a driving medium is admitted from the engine into these cylinders, the pistons move inward against the pressure of their springs M, and the racks cause the tooth-wheels and screw-bolts G to revolve and to be screwed up, so that the locking-bolts become automatically released. Connected with the pistons of this locking device may be safety-locks, consisting of arms N, pivotally attached to the hub D and having spring-influenced teeth O, adapted to engage grooves in the draw-bar of the counter coupling-head. It will be readily seen that when the pistons K move inward they also raise the arms N and release the teeth O. The driving medium can be discharged from the cylinders L by separate openings and valves arranged in the cylinders L, and after the discharge of the driving medium the pistons K, being under the influence of the spring M, as well as the racks, return to their normal position, and the locking-bolts E and locking-arms N are brought back into their locking position. By the approachment of the cars the brake action is effected. It is obvious that instead of this coupling-lock and this release device any other couplings may be employed without deviating from the inventive idea in any manner.

Having thus described the nature of my invention and in what manner the same is to be performed, what I claim, and desire to secure by Letters Patent of the United States, is—

1. A draft and buffing device for coupling on railroad and electric cars, composed of a cylinder having an outer open end, a piston moving in the cylinder and adapted to act upon an elastic medium conveyed to the brake, means for confining the piston to the cylinder, and a coupling-head adapted to enter the cylinder, substantially as specified.

2. A fastening device for couplings on railway and electric cars, serving simultaneously as a draft and buffing device, comprising pistons moving in the cylinders for the brake medium in a buffing direction, said pistons having attached to them the piston-rods by means of ball-joints, substantially as specified.

3. A draft and buffing device for coupling on railway and electric cars, comprising pistons moving in the cylinders for the brake medium in a buffing direction, said pistons having attached to them the piston-rods by means of ball-joints, substantially as specified.

4. A draft and buffing device for railway and electric cars, comprising couplings being on both sides formed as pistons with ball-joints and the entire diameter of these couplings being made to correspond with the inner diameter of the respective cylinder for the brake medium, substantially as specified.

5. The combination of the receptacle for the brake medium, the buffing-box, the casing of the draw-bar, and the socket-joint of the coupling, all in one cylinder, substantially as specified.

6. The combination of a brake-piston, the head of the draw-bar, the buffer and the coupling-carrying member all in one piston, substantially as specified.

7. The combination of a rod serving as a draw-bar or piston-rod, buffing-rod and coupling-rod with a cylinder, serving as a receptacle for the brake medium, as a buffing-box, as a casing for the draw-bar and as a socket-joint of the coupling, and with a piston serving as a brake-piston, as a head of the draw-bar, as a buffer and joint of the coupling, substantially as specified.

8. The combination of two or more rods, serving as draw-bar or coupling-rod, buffing-rod and piston-rod with two or more cylinders, serving as receptacle for the brake medium, buffer-box, casing of the draw-bar and socket-joint of the coupling and with two or more pistons serving as brake-piston, head of the draw-bar, buffer and joint of the coupling, substantially as specified.

9. The combination with a tube having three arms, each arm serving as cylinder for the brake medium, buffer-box, casing of the draw-bar and socket-joint of the coupling, with three rods, each serving as draw-bar or coupling-rod, buffer-rod and piston-rod and with three pistons, each serving as brake-piston, head of the draw-bar, buffer and joint of the coupling, substantially as specified.

10. In combination with the rods serving as draw-bar or coupling-rod, buffer-rod and piston-rod and with the pistons, serving as brake member, buffer, draw-bar, joint of the coupling, of a locking device adapted to lock each piston independently of the others in its initial or end position, substantially as specified.

11. The combination of the cylinder of the brake medium with any kind of coupling on railway and electric cars, the coupling-carrying members being formed as pistons working in the buffing direction upon an elastic medium, said pistons being prevented to fall out from the cylinders when exposed to draft, the diameter of the entire coupling acting as piston corresponding to the inner diameter of the cylinders, substantially as specified.

12. The combination of the cylinder of the brake medium with any kind of coupling on railway and electric cars, said cylinder of the brake medium being directly connected with the coupling by means of the coupling-carrying member formed to a piston, the diameter of the entire coupling acting as piston corresponding to the inner diameter of the cylinder, substantially as specified.

13. The combination of the cylinder of the brake medium with any kind of coupling on railway and electric cars, said cylinder for the brake medium being directly connected with the coupling by means of the coupling-carrying member formed as piston and the diameter of the entire coupling acting as piston corresponding to the inner diameter of the cylinder, said cylinders and pistons being adapted to replace separate buffers and separate draw-bars, substantially as specified.

14. The combination of the cylinder of the brake medium with any kind of coupling and a means to lock the coupling-carrying member in the cylinder on one or the other side of the coupling, substantially as specified.

In witness whereof I have hereunto signed my name in the presence of two subscribing witnesses.

KURT GEUCKE.

Witnesses:
HENRY HASPER,
WOLDEMAR HAUPT.